Oct. 28, 1969   L. G. STRIGGOW   3,475,673
CONTROL CIRCUIT FOR ALTERNATING CURRENT AND DIRECT
CURRENT LOADS AND WITH ZERO TURN-ON
AND ZERO TURN-OFF
Filed May 23, 1967

INVENTOR.
LEWIS G. STRIGGOW
BY
WILSON, SETTLE & BATCHELDER
ATT'YS.

United States Patent Office 3,475,673
Patented Oct. 28, 1969

3,475,673
CONTROL CIRCUIT FOR ALTERNATING CURRENT AND DIRECT CURRENT LOADS AND WITH ZERO TURN-ON AND ZERO TURN-OFF
Lewis G. Striggow, 1115 Marion Drive,
Holly, Mich. 48442
Filed May 23, 1967, Ser. No. 640,551
Int. Cl. H02m 7/44, 7/68
U.S. Cl. 321—43                                    15 Claims

ABSTRACT OF THE DISCLOSURE

A control circuit is provided which includes two controlled rectifiers and two diode rectifiers with one of the diode rectifiers being connected in inverted parallel relation with each of the controlled rectifiers. The input of one controlled rectifier and the cathode of one diode rectifier are connected to one side of an alternating current source, and the input of the other controlled rectifier and the cathode of the other diode rectifier are connected to the other side of the source. This provides a symmetrical circuit. Impedance means is connected to the control portions of the two controlled rectifiers and to the source for firing the controlled rectifiers. Switching means is connected between the impedance means and a zeroing point, and when the switching means is activated, it blocks the firing voltage and thus turns off the normally on controlled rectifiers. The output portions of the controlled rectifiers and the anodes of the diodes may be connected so as to supply either alternating current or direct current to a load. Thus, the control circuit accomplishes symmetrical control of alternating current and supplies either a direct current or an alternating current output. Switching of the output is accomplished such that the load is activated only at the beginning of a half-cycle of power and is deactivated only at the end of a half-cycle of power.

Background of the invention

In the art of controlling alternating current and sinusoidal direct current in circuit loads, the opposing half-cycle waveforms due to this loading may become unbalanced, or loose their proper continuity, or otherwise become distorted when they are controlled by solid state components. This loss of symmetry or other distortion of the output waveform is due to unbalanced signal circuitry, and the reaction of solid state components to the load when power is applied to the load. There has been a need for a simple control circuit which would accomplish symmetrical control of alternating current waveforms and which would not distort the output waveforms. It would also be desirable to have a symmetrical control circuit which could switch current on and off in a load, and which could supply either alternating current or direct current to the load.

Object of the invention

It is an object of this invention to provide a symmetrical control circuit operating on alternating current supplied from a source and acting to switch either alternating current or direct current on and off in a load.

Another object if the invention is to provide a control circuit in which symmetrical current paths are provided by silicon controlled rectifiers and diode rectifiers connected in inverted parallel relation.

Another object of the invention is to provide a controlled circuit having symmetrical current paths provided by silicon controlled rectifiers and diode rectifiers, and also having means for switching the silicon controlled rectifiers on and off.

Another object of the invention is to provide a control circuit as described in the last preceding paragraph in which the switching means is also a silicon controlled rectifier with appropriate firing circuitry.

A further object of the invention is to provide firing circuits for the silicon controlled rectifiers which operate on alternating current supplied from the alternating current source.

Still another object of the invention is to provide a control circuit for switching a load on and off whereby the load may be activated only at the beginning of a half-cycle of power, and will be deactivated only at the end of a half-cycle of power.

Other objects of this invention will appear in the following description and appended claims reference being had to the accompanying drawings forming a part of this specification wherein like reference characters designate corresponding parts in the several views.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
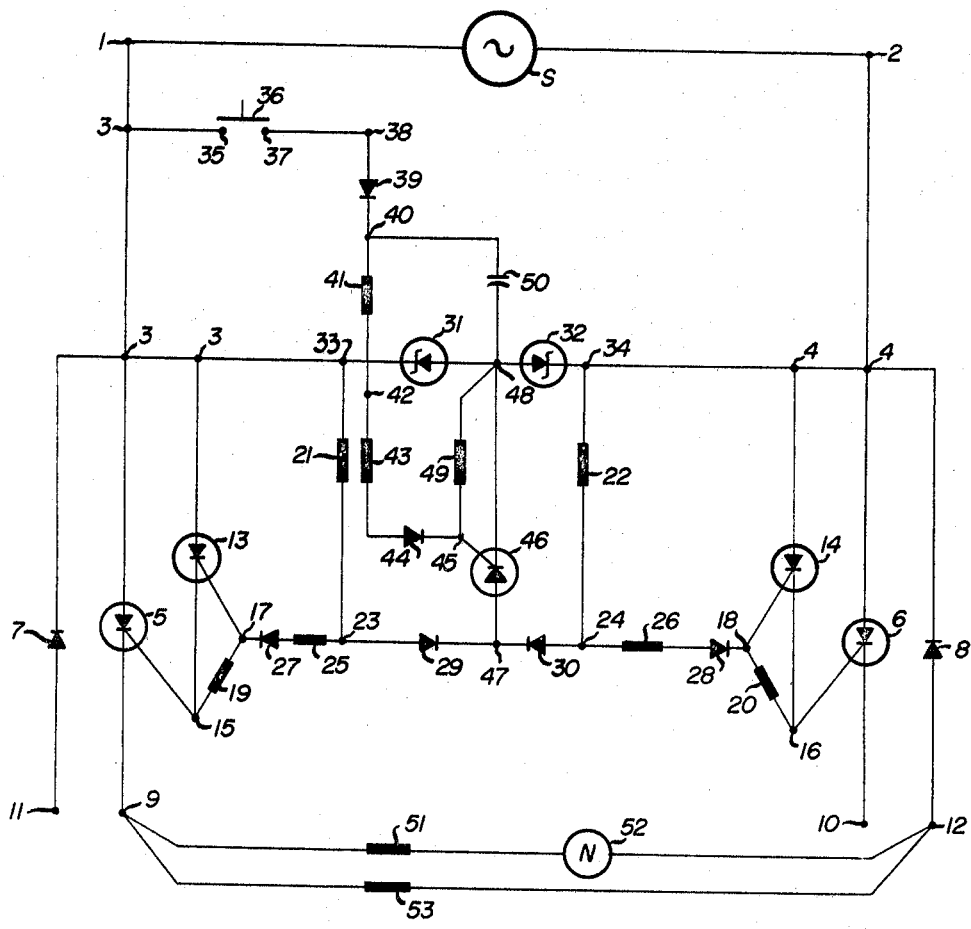
FIGURE 1 is a schematic diagram of a control circuit in accordance with the invention.

As shown on the drawings:

Referring first to FIGURE 1, numerals 1 and 2 are the terminals of an alternating current source S from which alternating current is supplied to the control circuit of the invention. Numerals 3 are junctions which are electrically common with the anode of a silicon controlled rectifier 5, and numerals 4 are junctions which are electrically common with the anode of another silicon controlled rectifier 6. Thus, the anodes, or input portions, of the silicon controlled rectifiers 5 and 6 are connected respectively to the opposite sides of the alternating current source S.

A diode rectifier 7 is connected in inverted parallel relation with silicon controlled rectifier 5, and another diode rectifier 8 is connected in inverted parallel relation with silicon controlled rectifier 6. The cathode of diode rectifier 7 is connected to an anode junction 3, and thus is connected to one side of source S, and the cathode of diode rectifier 8 is connected to an anode junction 4, and thus is connected to the opposite side of alternating current source S. The cathode terminals 9 and 10 of silicon controlled rectifiers 5 and 6 respectively, and the anode terminals 11 and 12 of diode rectifiers 7 and 8 respectively are to be connected either to an alternating current load 56 in the manner illustrated in FIGURE 2, or to a direct current load 59 in the manner illustrated in FIGURE 3.

Figure 2:
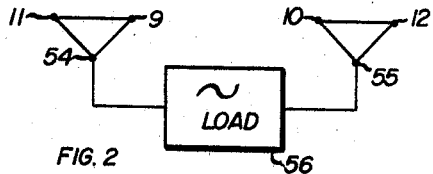
FIGURE 2 illustrates a load for the control circuit and shows terminal connections for connecting the load in the control circuit so that alternating current is applied to the load.

Referring first to FIGURE 2, terminals 9 and 11 are connected together and to a terminal 54 on one side of alternating current load 56, and terminals 10 and 12 are connected together and to a terminal 55 on the other side of load 56. Thus, when silicon controlled rectifier 5 is conducting, alternating current is supplied through terminals 9 and 54, load 56, terminals 55 and 12 and diode rectifier 8 back to the zero voltage side of source S. When silicon controlled rectifier 6 is conducting, current is supplied through terminals 10 and 55, load 56, terminals 54 and 11, and diode rectifier 7 back to the zero voltage side of source S. The silicon controlled rectifiers 5 and 6 conduct in alternation, as will be explained further, and thus alternating current is supplied through the load 56 when the output terminals 9, 10, 11 and 12 are connected as shown in FIGURE 2.

Figure 3:
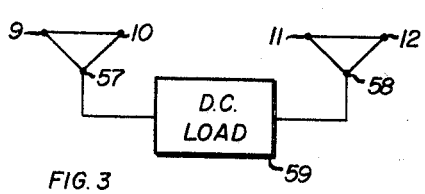
FIGURE 3 shows a direct current load and terminal connections for connecting the load in the control circuit so that direct current is supplied to the load.

In FIGURE 3, it may be seen that cathode terminals 9 and 10 for silicon controlled rectifiers 5 and 6 are connected together and to a terminal 57 on one side of a DC load 59, and anode terminal 11 and 12 for diode rectifiers 7 and 8 are connected to a terminal 58 on the other side of DC load 59. When silicon controlled rectifier 5 is conducting, current is supplied through terminal 9 and 57, load 59, terminals 58 and 12, and diode rectifier 8 back to the zero voltage side of the source S. When silicon controlled rectifier 6 is conducting, current is supplied through terminals 10 and 57, through load 59 in the same direction as the previous current flows, through terminals 58 and 11, and diode rectifiers 7 back to the zero side of the signal source S. Thus, FIGURE 3 shows connections for supplying sinusoidal direct current through a load 59.

Silicon controlled rectifiers 5 and 6 may be high power devices which are fired by lower power silicon controlled rectifiers 13 and 14 respectively. Silicon controlled rectifier 13 has its anode connected to terminal 3 and thus to one side of the source S. The cathode of silicon controlled rectifier 13 is connected in common with the gate of silicon controlled rectifier 5 at a junction 15. The anode of silicon controlled rectifier 14 is connected to a terminal 4 and thus to the opposite side of alternating current source S. The cathode of silicon controlled rectifier 14 and the gate of silicon controlled rectifier 6 are connected in common at a junction 16. A resistor 19 is connected between the cathode 15 and the gate 17 of silicon controlled rectifier 13. Similarly, a resistor 20 is connected between the cathode 16 and the gate 18 of the silicon controlled rectifier 14. Resistors 19 and 20 adjust the sensitivity of the silicon controlled rectifiers 13 and 14 to the firing voltage.

Firing voltage for silicon controlled rectifier 13 is supplied by an impedance network consisting of resistors 21 and 25 and diode rectifier 27, and firing voltage for silicon controlled rectifier 14 is supplied an impedance network consisting of resistors 22 and 26 and a diode rectifier 28. Resistor 21 is connected at one end to junction 33 which is electrically common with the anode terminals 3 and thus receives voltage from one side of the alternating current source S. The other end of resistor 21 is connected to a junction 23 which is connected to gate terminal 17 of silicon controlled rectifier 13 by a resistor 25 and a diode rectifier 27. Diode rectifier 27 rectifies the alternating current signal so that only positive half-cycles are applied to the gate of silicon controlled rectifier 13. The latter half-cycles are in phase with the voltage applied to the anode of silicon controlled rectifier 13, so silicon controlled rectifier 13 and also silicon controlled rectifier 5 fire when terminals 3 go positive.

Resistor 22 is connected to a junction 34 which is electrically common with the anode terminals 4 which in turn are connected to the other side of source S. Thus, resistor 22 receives voltage from the source S in phase with the voltage which is applied to the anode terminals of silicon controlled rectifiers 6 and 14. The other end of resistor 22 is connected to a junction 24 which in turn is connected to the gate terminal 18 of silicon controlled rectifier 14 by a resistor 26 and a diode rectifier 28. Diode rectifier 28 serves to rectify the signal in the impedance network so that only positive half-cycles are applied to the gate 18 of silicon controlled rectifier 14. Thus, silicon controlled rectifier 14 and also silicon controlled rectifier 6 are fired when terminals 4 go positive.

With this symmetrical arrangement of silicon controlled rectifiers and firing networks, it is apparent that rectifiers 13 and 14 fire on alternate half-cycles of the voltage supplied by source S, and consequently power silicon controlled rectifiers 5 and 6 also fire on alternate half-cycles of the voltage from source S. The silicon controlled rectifiers are normally on, and so will supply either alternating current or direct current to the load depending on the output connections so long as the firing voltage is not blocked. Blocking of the firing voltage to turn off the silicon controlled rectifiers and thus interrupt current to the load is accomplished by a switching network which will now be described.

Diode rectifiers 29 and 30 connect junctions 23 and 24 to a positive voltage junction 47 such that junction 47 is maintained positive by the voltages applied to resistors 21 and 22. Two Zener diodes 31 and 32 are connected back-to-back between junctions 33 and 34 and a junction 48 of zero potential. The anode-cathode path of a silicon controlled rectifier 46 is connected in series between junctions 47 and 48 to provide a path for zeroing junctions 23 and 24 of the impedance networks. Thus, when silicon controlled rectifier 46 is conducting, the firing voltage for the silicon controlled rectifiers 5, 6, 13 and 14 is blocked so these devices will turn off at the end of a half-cycle of the anode voltage applied thereto.

It may be noted that the Zener diodes 31 and 32 serve a function in addition to their function of providing a zero potential at junction 48. If a spike or other abnormally high voltage should appear on the voltage supplied on source S, and if the spike exceeds the Zener voltage of the diodes 31 and 32, it will be shorted directly through the Zener diodes 31 and 32 without passing through the load. Thus, Zener diodes 31 and 32 provide a by-pass for overvoltages.

A normally open switch consisting of fixed contacts 35 and 37 and a movable contact 36 is connected to one of the anode terminals 3 and so is connected to one side of source S. Fixed contact 37 is connected to the anode 38 of a diode rectifier 39, and the cathode 40 of diode rectifier 39 is connected via a resistor 41, a junction 42, another resistor 43 and a diode rectifier 44 to the gate terminal 45 for silicon controlled rectifier 46. It will be seen that when switch 36 is closed, positive half-cycles appearing at anode terminals 3 will be supplied through the circuit path just described to the gate 45 of silicon controlled rectifier 46. The positive voltage appearing at junction 40 charges a capacitor 50 which is connected between junction 40 and the point of zero potential 48. In the period between positive half-cycles of the voltage supplied through switch 36, the capacitor 50 discharges through resistors 41 and 43 and diode rectifier 44 to keep the voltage at gate 45 positive. Thus, when switch 36 is closed, silicon controlled rectifier 46 will conduct the current supplied through rectifier 29 to block silicon controlled rectifiers 5 and 13, and then will conduct current supplied through rectifier 30 to block the firing of silicon controlled rectifiers 6 and 14. This continuous firing of silicon controlled rectifier 46 will continue so long as the switch 36 is closed. It may be noted that the gate 45 of silicon controlled rectifier 46 is connected to the point of zero potential 48 by a resistor 49 merely for the purpose of adjusting the sensitivity of silicon controlled rectifier 46. Diodes 27, 28, 29, 30, 39 and 44 serve another function, in addition to their rectifying function, of preventing feedback through the control circuit. Thus, these diodes serve an isolation function.

It may also be noted that the switch 36 could be replaced by an electrical or electronic switching device so that the control circuit may be turned off by other circuitry. Also, the controlled rectifier 46 and its firing circuitry may in some applications be replaced by a mechanical switch connected between points 47 and 48.

It is possible to place a jumper across fixed contacts 35 and 37 so that silicon controlled rectifier 46 fires continuously. Controlled rectifiers 5 and 6 are then normally off. To turn them on, a switch may be provided between junctions 42 and 48 which, when closed, will block the firing voltage for silicon controlled rectifier 46, thus allowing controlled rectifiers 5, 6, 13 and 14 to fire.

Resistor 51 and lamp 52 are serially connected between terminals 9 and 12 to provide a visual indication, by lighting of the lamp, of the operating condition of the control circuit, and, when the controlled rectifiers and parallel diodes are connected to supply a symmetrical signal to the load, the lamp indicates the phase relationship of the symmetrical output.

It is apparent from the foregoing description that the invention provides a control circuit which accomplishes symmetrical control of alternating current to provide balanced loading characteristics in opposing half-cycle segments of the alternating current. The control circuit may have either an alternating current load or a direct current load, and acts as a switch to either supply current to the load or block current from the load in a manner that the load may be activated only at the beginning of a half-cycle of power, and will be deactivated only at the end of a halfcycle of power. The circuitry is relatively simple and straightforward and may be produced economically.

I claim:

1. A control circuit for supplying a controlled waveform to a load from a source of alternating current, said control circuit comprising first and second controlled rectifier means each having an input portion, an output portion and a control portion, means for connecting said input portion of said first controlled rectifier means to one side of said source, means for connecting the input portion of said second controlled rectifier means to the other side of said source, first and second rectifier means each having an anode and a cathode, means for connecting the cathode of said first rectifier means to said one side of said source, means for connecting said cathode of said second rectifier means to said other side of said source, said first controlled rectifier means and said first rectifier means being in inverted parallel relation and said second rectifier means and said second controlled rectifier means also being in inverted parallel relation, said load being connected to said controlled rectifier means and to said rectifier means, impedance means connected to said control portions of said controlled rectifier means, means for connecting said impedance means to said source to supply firing voltage to said control electrodes alternately to provide alternate conduction of said controlled rectifier means, and switching means connected to said impedance means for rendering said controlled rectifier means nonconductive upon actuation of said switching means, said switching means including a silicon controlled rectifier having an anode connected to said impedance means, a cathode connected to a point of reference potential, and a gate connected to one of said input portions.

2. A control circuit as claimed in claim 1 in which said first and second controlled rectifier means each includes a pair of silicon controlled rectifiers each having an anode, a cathode and a gate, the anodes of each pair of silicon controlled rectifiers being connected together to provide said input portion, the cathode of one of said silicon controlled rectifiers in each pair providing said output portion, the cathode of the other silicon controlled rectifier in each pair being connected to the gate of said one silicon controlled rectifier, and the gate of said other silicon controlled rectifier of each pair providing said control portion and being connected to said impedance means so that firing of said other silicon controlled rectifier causes firing of said one silicon controlled rectifier.

3. A control circuit as claimed in claim 1 in which said switching means includes a silicon controlled rectifier having an anode connected to said impedance means, a cathode connected to a point of reference potential, and a gate connected to one of said input portions by a unidirectional current path, and means in said unidirectional path for selectively actuating said silicon controlled rectifier to fire the same to block the firing voltage supplied to said controlled rectifier means.

4. A control circuit as claimed in claim 3 and further including a first Zener diode having an anode connected to said point of reference potential and a cathode connected to said input portion of said first controlled rectifier means, and a second Zener diode having an anode connected to said point of reference potential and a cathode connected to said input portion of said second controlled rectifier means, whereby said Zener diodes establish said point of reference potential at zero voltage.

5. A control circuit as claimed in claim 4 in which said unidirectional path includes a rectifier preventing signal feedback to said one input portion.

6. A control circuit as claimed in claim 5 and further including a capacitor connected to said unidirectional path and to said point of reference potential for sustaining firing current in said path by discharging through said silicon controlled rectifier between half-cycles of the current supplied to said unidirectional path from said one input portion.

7. A control circuit as claimed in claim 6 in which the anode of said silicon controlled rectifier is connected to said impedance means by a rectifier preventing feedback of signals from said silicon controlled rectifier to said impedance means.

8. A control circuit as claimed in claim 7 in which said impedance means includes first and second impedance networks for respectively firing said first and second controlled rectifier means, said first impedance network comprising first resistor means connected to said input portion of said first controlled rectifier means and to one of said rectifiers connected to said impedance means, second resistor means connected to the junction between said first resistor means and said one rectifier, and another rectifier connecting said second resistor means to the gate portion of said first controlled rectifier means, and said second impedance network comprising third resistor means connected to said input portion of said second controlled rectifier means and to the other of said rectifiers connected to said impedance means, fourth resistor means connected to the junction between said third resistor means and said other rectifier, and a further rectifier connecting said fourth resistor means to the gate portion of said second controlled rectifier means.

9. A control circuit as claimed in claim 1 further including resistor means connected between the output portion of one said controlled rectifier means and the anode of one of said rectifier means to complete the control circuit even when said load is not connected thereto.

10. A control circuit as claimed in claim 1 further including a resistor and a lamp connected in series between the output portion of one of said controlled rectifier means and the anode of one of said rectifier means to provide a visual indication, by lighting said lamp, of the operating condition of said control circuit, and, when said controlled rectifier means and said rectifier means are connected to supply a symmetrical signal to a load, said lamp indicating the phase relationship of the symmetrical output of said control circuit.

11. A control circuit as claimed in claim 1 in which said output portion of said first controlled rectifier means and said anode of said first rectifier means are connected to one side of said load, and said output portion of said second controlled rectifier means and said anode of said second rectifier means are connected to the other side of said load, whereby said load receives alternating current.

12. A control circuit as claimed in claim 1 in which said output portions of said first and second controlled rectifier means are connected to one side of said load and said anodes of said first and second rectifier means are connected to the other side of said load, whereby said load receives direct current.

13. A control circuit as claimed in claim 1 in which said impedance means comprises first and second impedance networks isolated from each other with said first impedance network being connected to the control portion of said first controlled rectifier means and to one side of said source for supplying firing voltage to said control portion in phase with the voltage supplied to the input portion of said first controlled rectifier means, and said second impedance network being connected to the control portion of said second controlled rectifier means and to the other side of said source for supplying firing voltage to said control portion of said second controlled rectifier means in phase with the voltage applied to said input portion of said second controlled rectifier means.

14. A control circuit for supplying a controlled waveform to a load from a source of alternating current, said control circuit comprising first and second controlled rectifier means each having an input portion, an output portion and a control portion, means for connecting said input portion of said first controlled rectifier means to one side of said source, means for connecting the input portion of said second controlled rectifier means to the other side of said source, first and second rectifier means each having an anode and a cathode, means for connecting the cathode of said first rectifier means to said one side of said source, means for connecting said cathode of said second rectifier means to said other side of said source, said first controlled rectifier means and said first rectifier means being in inverted parallel relation and said second rectifier means and said second controlled rectifier means also being in inverted parallel relation, said load being connected to said controlled rectifier means and to said rectifier means, impedance means connected to said control portions of said controlled rectifier means, means for connecting said impedance means to said source to supply firing voltage to said control electrodes alternately to provide alternate conduction of said controlled rectifier means, and switching means connected to said impedance means for rendering said controlled rectifier means nonconductive upon actuation of said switching means, said output portion of said first controlled rectifier means and said anode of said first rectifier means being connected to one side of said load, and said output portion of said second controlled rectifier means and said anode of said second rectifier means being connected to the other side of the load, whereby said load receives alternating current.

15. A control circuit as claimed in claim 14 in which said switching means is a silicon controlled rectifier.

References Cited

UNITED STATES PATENTS

| | | | |
|---|---|---|---|
| 3,246,227 | 4/1966 | Strohmeier | 321—45 X |
| 3,268,793 | 8/1966 | King et al. | 321—46 |
| 3,277,362 | 10/1966 | Elliott | 323—24 |
| 3,299,341 | 1/1967 | Corey | 321—47 |

JOHN F. COUCH, Primary Examiner

G. GOLDBERG, Assistant Examiner

U.S. Cl. X.R.

307—241; 321—44, 46; 323—22, 25